Sept. 12, 1967 M. HACSKAYLO 3,341,362

THIN FILM DIODE MANUFACTURE

Filed Aug. 26, 1964 3 Sheets-Sheet 1

INVENTOR
MICHAEL HACSKAYLO

BY Hurvitz & Rose

ATTORNEYS

INVENTOR
MICHAEL HACSKAYLO

BY Hurvitz & Rose

ATTORNEYS

INVENTOR
MICHAEL HACSKAYLO
BY Hurvitz & Rose
ATTORNEYS

United States Patent Office 3,341,362

Patented Sept. 12, 1967

3,341,362

THIN FILM DIODE MANUFACTURE

Michael Hacskaylo, Falls Church, Va., assignor to Melpar, Inc., Falls Church, Va., a corporation of Delaware Filed Aug. 26, 1964, Ser. No. 392,235

6 Claims. (Cl. 117—217)

Figure 1:
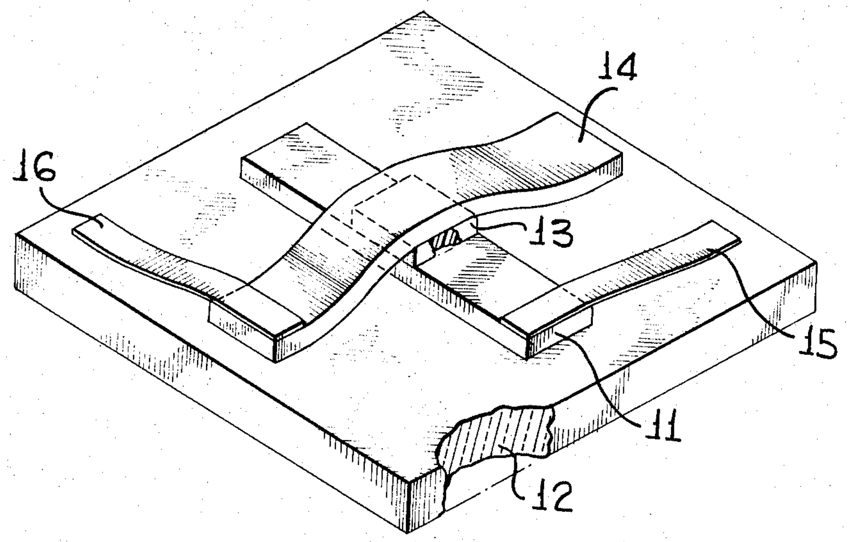

The present invention relates generally to thin film diodes and, more particularly, to a thin film diode in which a sharp transition in the conduction mechanism occurs between the Schottky and avalanche mechanisms and to a method for making such a diode.

Others have reported thin film diodes in which the tunneling or avalanche mechanism is the only current contributing factor once the diode voltage exceeds the potential where Ohm's law holds. These diodes are believed to be typically formed by vacuum vapor depositing a base electrode, generally aluminum, on an insulating substrate maintained at elevated temperatures, on the order of 300° C. An insulating layer having a thickness on the order of 30–100 Angstroms is then formed on the base electrode. Frequently, the insulating layer constitutes an oxide layer formed by firing on the base electrode in full atmosphere. Subsequently, a counter electrode, that typically has been aluminum, is vacuum vapor deposited on the insulating layer, with the substrate maintained at approximately the same elevated temperature as during base electrode deposition. I state that these diodes are believed formed in the recited manner because: (1) the reports provide insufficient information on the subject; and (2) these are the conventional methods by which thin films are formed.

According to the present invention, thin film diodes are formed in which the Schottky mechanism occurs at room temperature. My experiments and observations show that this mechanism, where log $I \alpha V^{1/2}$ occurs for diode voltages in excess of those for which Ohm's law holds, generally greater than about 0.5 volt. The Schottky mechanism holds for voltage up to the difference between the work function of the positively biased electrode and the potential of the positively biased electrode-metal-insulator barrier, $\phi_W - \phi_S$. For voltages in excess of $\phi_W - \phi_S$, up to the work function of the positively biased metal, current flow suddenly switches to the avalanche or tunneling mechanism, log $I \alpha V$. Because of the sudden switch in mechanisms and the rate of current increase with increasing voltage is much greater under avalanche conditions than with the Schottky mechanism, the transition at $\phi_W - \phi_S$ constitutes a sharp, distinct break point in the diode voltage versus current characteristic curve. In accordance with the present invention, the break point can be controlled by selecting, as electrodes, metals having large or small work functions. If a large break voltage is desired, a metal with a high work function is selected, while the opposite holds when a low break voltage is sought.

The diode of the present invention is formed by vacuum vapor depositing the top or counter electrode with the substrate held at room temperature, about 25° C., in contrast to the high temperatures I believe are utilized in the prior art. I subscribe the distinctions observed between the diodes of the present invention and those of the prior art, relying upon tunneling, to this difference in fabrication method.

While others have reported thin film diodes relying upon the Schottky mechanism at room temperature, I am unaware of any one having observed the sharp transition between Schottky and avalanche conduction that is attained at room temperature with the diodes of the present invention. While certain investigators found a sharp transition between the relationship log $I \alpha V^{1/2}$ and log $\alpha V$ for thin film diodes operating at liquid nitrogen temperatures, they were apparently not successful in obtaining such a transition at room temperature. At room temperature, the reported current versus voltage characteristic of these diodes was solely in accordance with log $I \alpha V^{1/2}$. Room temperature currents were also less than those at liquid nitrogen temperature. Because of the latter factor, these investigators concluded that the Schottky mechanism was not controlling. In the diodes I have constructed, the Schottky mechanism and its sharp break hold for room temperatures and above, but at liquid nitrogen temperatures the plotted data indicated conduction only by tunneling.

Because diodes of the present invention have a sharp transition in their voltage current characteristic, they are ideally suited as voltage limiters in thin film circuits operating at room temperatures or above. The limiting voltage break point is built into the diodes and is determined by selection of the counter electrode material.

It is accordingly an object of the present invention to provide a new and improved thin film diode having a sharp break point in its characteristic curve, and a method for fabricating same.

Another object of the present invention is to provide a thin film diode having a sharp break between the Schottky and tunneling conduction mechanisms and to method for making same.

A further object of the invention is to provide a thin film diode having a sharp break in its current versus voltage characteristic, the voltage of said break being determined by the work functions of the diode electrodes.

An additional object of the invention is to provide a new and improved thin film diode limiter.

Still a further object is to provide a thin film diode limiter capable of operating at room temperatures and above and possessing a sharp discontinuity in its current voltage characteristic.

Yet a further object of the invention is to provide a diode limiter that operates at room temperature with a characteristic that sharply changes from log $I \alpha V^{1/2}$ to log $I \alpha V$ when the diode voltage is varied about a predetermined value.

Figure 4:
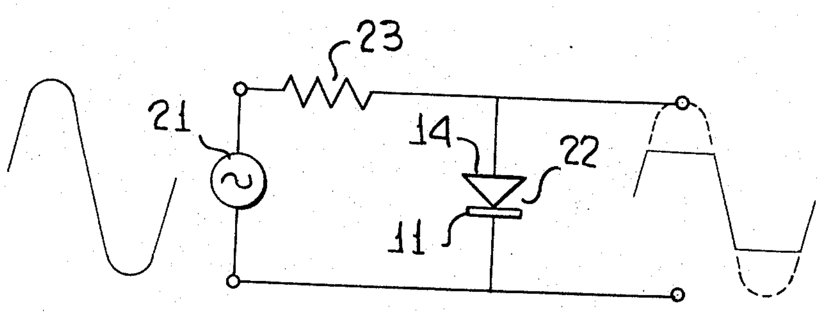
Figure 2B:
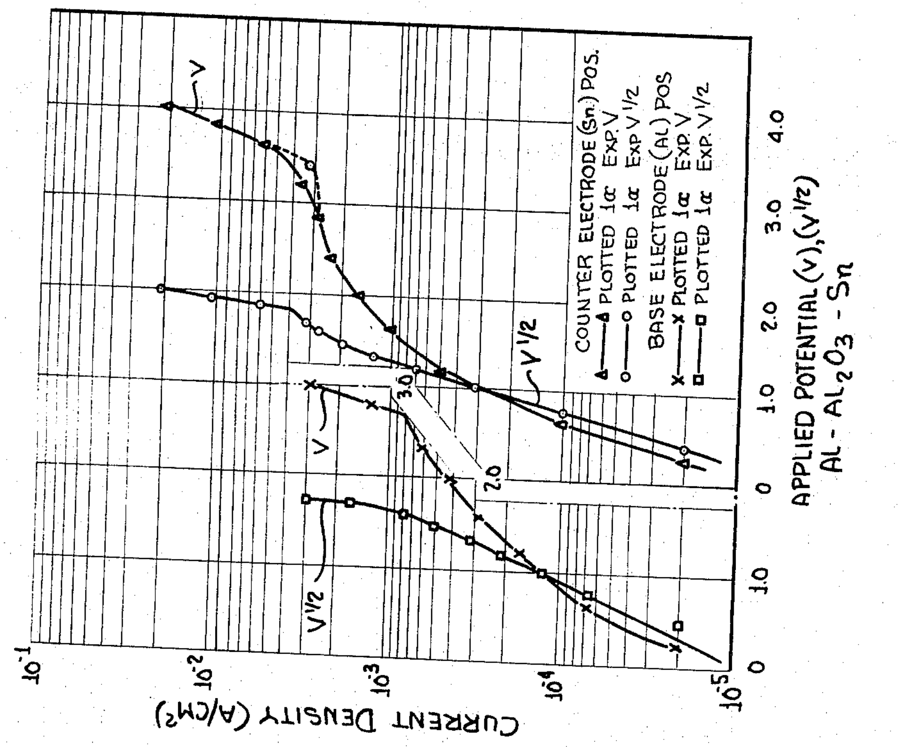
Figure 2A:
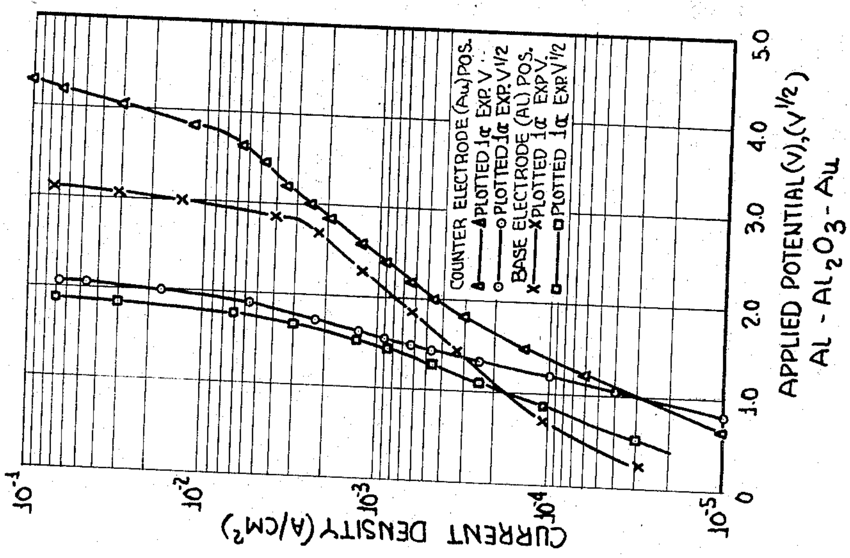
Figures 2C, 3A, 3B, 3C:
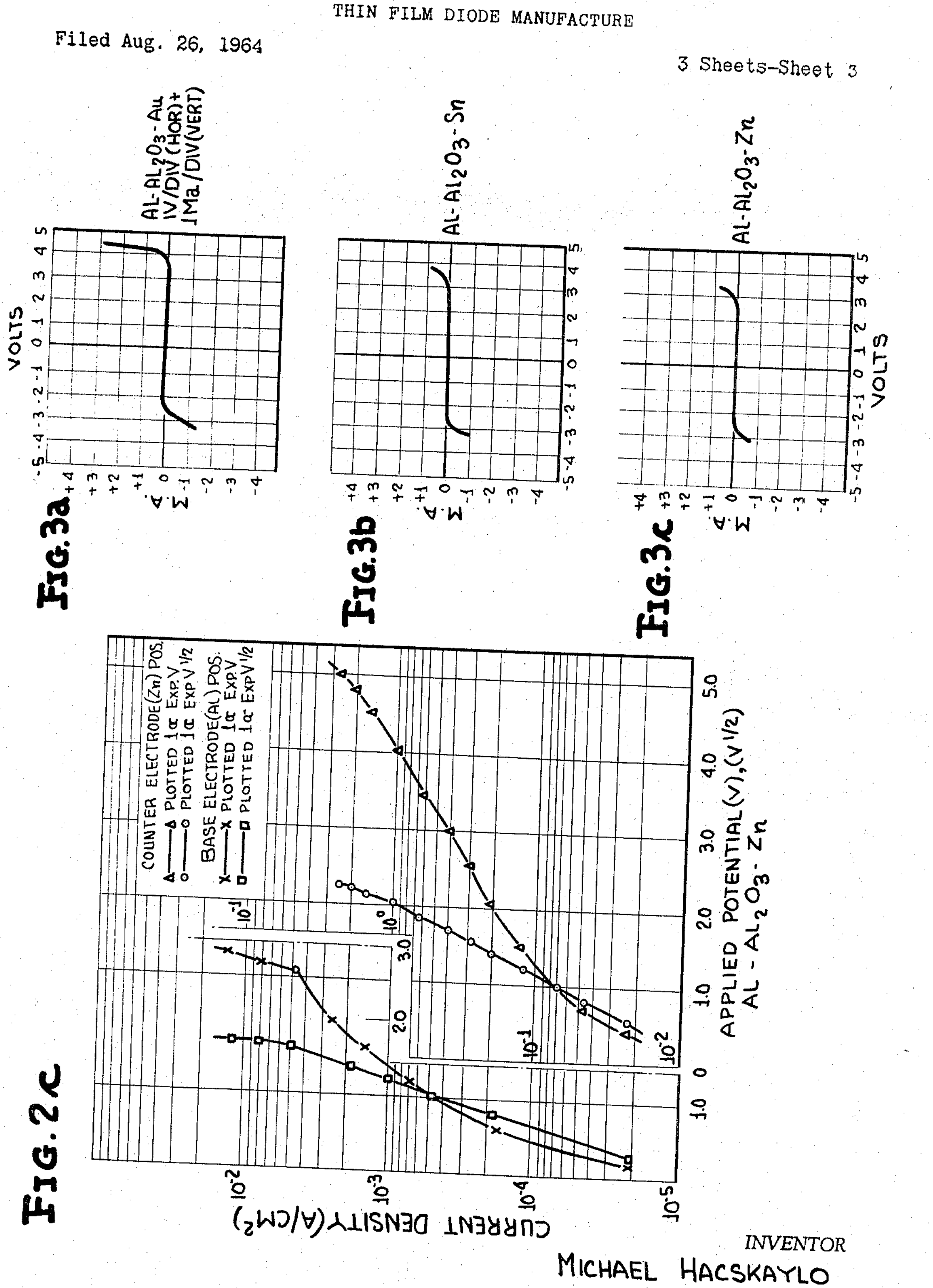

The above and still further objects, features and advantages of the present invention will become apparent upon consideration of the following detailed description of one specific embodiment thereof, especially when taken in conjunction with the accompanying drawings, wherein:

FIGURE 1 is a perspective view of a thin film diode according to a preferred embodiment of the invention;

FIGURES 2*a–c* are current versus voltage characteristics of various thin film diodes of the present invention, in logarithmic plots;

FIGURES 3*a–c* are current versus voltage characteristics of the diodes of various thin film diodes of the present invention, in linear plots; and FIGURE 4 is a circuit diagram illustrating the diode limiter of the present invention.

Reference is now made to FIGURE 1 of the drawings, wherein the thin film diode of the present invention is illustrated as comprising thin metal layer 11, typically aluminum, formed on fused silica substrate 12. Layer 11, constituting one diode electrode, is approximately 1000 Angstroms thick and between 0.5 and 1.5 millimeters wide. On top of layer 11 is insulating layer 13, usually the metal oxide, that has a thickness on the order of 30 to 100 Angstroms. Counter electrode 14, a metal having a work function required to provide the desired break voltage in the diode characteristic curve, e.g., zinc, tin or gold, substantially covers insulating layer 13. Counter electrode 14 is between 500 and 1000 Angstroms thick and of slightly less width than layer 13 so it does not contact electrode 11. Metal contacts 15 and 16 cover one end of electrodes 11 and 14, respectively, so that connections can be made to an external circuit. In the alternative, electrodes 11 and 14 are connected directly to thin film leads or resistors on the face of substrate 12.

The thin film diode of FIGURE 1 is preferably fabricated by vapor depositing layer 11 on substrate 12, after the vacuum deposition chamber containing the substrate has been outgassed for about fifteen minutes at a vacuum of about $10^{-6}$ torr. During the outgassing operation, substrate 12 is heated to approximately 250° C. Thereafter, the substrate temperature is reduced to about 120° C. and base electrode 11 is deposited. If electrode 11 is aluminum deposited to approximately 1000 A., as is generally the case, the deposited substrate is removed from the vacuum chamber and insulating layer 13 is formed by heating layer 11 in air at 400° C. for twenty minutes. Substrate 12 is then returned to the vacuum chamber, which is subsequently outgassed at room temperature prior to deposition of layer 14. During deposition of the zinc, gold or tin electrode 14, the vacuum chamber pressure is maintained at $10^{-6}$ torr while substrate 12 and the layers deposited thereon are substantially at room temperature, about 25° C.

After the diode has been completed and removed from the deposition chamber, contacts 15 and 16 are secured to electrodes 11 and 14 by applying air drying silver paste to the exposed electrode surfaces.

An alternative method for fabricating diodes having the observed sharp break in their characteristic curves is to deposit electrode 11, as indicated supra. Thereafter, with substrate 12 in the vacuum chamber and at room temperature, insulating layer 13 of silicon monoxide is deposited on electrode 11 to a thickness on the order of 50 to 100 Angstroms. Counter electrode 14 is then formed, as indicated supra, i.e., with substrate 12 at room temperature.

The voltage-current characteristics of three fabricated diodes are illustrated in FIGURES 2*a*–2*c*. These diodes are respectively of the Al-$Al_2O_3$-Au, Al-$Al_2O_3$-Sn and Al-$Al_2O_3$-Zn configuration, in which aluminum is base electrode 11 and the counter electrode 14 is the other metal in each case. In each diagram, two plots with the squares and circles denominating the plotted points have their abscissae directly proportional to exp $V^{1/2}$. In contrast, the two plots with the triangles and crosses indicating the plotted points have their abscissae directly proportional to exp V. In consequence, when diode conduction follows the Schottky mechanism, $I \alpha \exp V^{1/2}$ (log $I \alpha V^{1/2}$), the square and circle plots are straight lines and when it follows the tunneling or avalanche mechanism, $I \alpha \exp V$ (log $I \alpha V$), the triangle and cross plots are straight lines. An inspection of FIGURES 2*a*–2*c*, thus reveals that the Schottky mechanism control for voltages less than the potential difference of the work function of the positively biased electrode and the positive metal insulator barrier ($\phi_W - \phi_S$); above this voltage, the curves indicate that the diode operates as a tunneling device until the work function of the positive electrode is exceeded. The latter occurrence results in intermittent and unpredictable diode operation. With typical signal sources that drive thin film circuits, the probability of the counter electrode work function being exceeded is remote because of the very low diode impedance once tunneling mechanism is achieved. Another observation noted is the asymmetrical nature of the curves for the different polarities applied to the diodes, further evidence that the indicated mechanisms occur.

FIGURES 3*a*–3*c*, linear voltage versus current plots of the Al-$Al_2O_3$-Au, Al-$Al_2O_3$-Sn and Al-$Al_2O_3$-Zn diodes, with counter electrode 14 indicated as positive in each case, graphically show the sharp or substantially discontinuous transition and asymmetrical nature of the fabricated units. It is noted that the transition in each instance occurs at a voltage equal to $\phi_W - \phi_S$.

Reference is now made to FIGURE 4 of the drawing wherein signal source 21 is applied to counter electrode 14 of thin film diode limiter 22 of the present invention by resistor 23, that is usually of thin film construction. Base electrode 11 of diode 22 is connected directly to the other side of source 21. The circuit operates at room temperature, 25° C., or above, with maximum temperatures on the order of 100° C.

When the voltage across the diode 22 is going positive and is between zero and about 0.5 voltage, the diode impedance is constant at a relatively large resistance so that the voltage across output electrodes 11 and 14 follows the input waveform. As the potential across diode 22 exceeds 0.5 volt, diode conduction follows the Schottky mechanism, i.e., as the diode potential increases, the diode impedance decreases. The decreasing diode impedance does not materially affect the wave shape at the diode output electrodes. When the voltage of source 21 increases additionally, so that the diode breaks into avalanche conduction, the top portion of the input wave shape is cut off, thereby limiting the voltage across electrodes 11 and 14. On the negative excursion of source 21, a similar mechanism occurs to again limit the output voltage. The negative voltage at which limiting occurs is different than on the positive half cycle, if electrodes 11 and 14 have different work functions.

While I have described and illustrated one specific embodiment of my invention, it will be clear that variations of the details of construction which are specifically illustrated and described may be resorted to without departing from the true spirit and scope of the invention as defined in the appended claims.

I claim:

1. Method of fabricating a thin film diode in which current conduction is governed by Schottky mechanism for a first range of biasing voltages and by avalanche mechanism for a second contiguous range of biasing voltages, a substantially sharp transition point occurring in the voltage versus current characteristic of said diode between said ranges, said method comprising vacuum depositing a discrete layer of aluminum of substantially uniform thickness of about 1,000 Angstroms on an insulating substrate maintained at a temperature of approximately 120° C. at a pressure on the order of approximately $10^{-6}$ torr; forming a discrete thin insulating film of substantially uniform thickness in the range from approximately 30 Angstroms to approximately 100 Angstroms on said aluminum layer; and vacuum depositing a discrete metal counter-electrode layer on said insulating film to a substantially uniform thickness in the range from approximately 500 Angstroms to 1,000 Angstroms at said pressure while maintaining said substrate, said aluminum layer, and said thin insulating film at a temperature of approximately 25° C.

2. The method according to claim 1 wherein said transition point depends upon the work function of the metal counter-electrode and the barrier potential of said counter-electrode and said thin insulating film, and the metal of said counter-electrode is selected to provide a difference between said work function and said barrier potential for controlling the location of said transition point in said voltage versus current characteristic of said diode.

3. The method according to claim 1 wherein said counter-electrode is a metal selected from the group consisting of zinc, tin, and gold.

4. The method according to claim 1 wherein said film is formed by oxidizing said aluminum layer.

5. The method according to claim 1 wherein said thin insulating film is formed by vacuum depositing an insulating material while maintaining said substrate and said aluminum layer at a temperature of approximately 25° C. at said pressure.

6. The method according to claim 5 wherein said insulating material is silicon monoxide.

References Cited

UNITED STATES PATENTS

| | | | |
|---|---|---|---|
| 3,056,073 | 9/1962 | Mead | 317—234 |
| 3,116,427 | 12/1963 | Giaever | 317—234 |
| 3,155,886 | 11/1964 | Pankove | 317—234 |

OTHER REFERENCES

Journal of Applied Physics, "Operation of Tunnel-Emission Devices," by Mead, April 1961, vol. 32, No. 4, pp. 646–652.

Popular Electronics, "The Zener Diode," by Shaughnessy, June 1961, pp. 76–82.

ALFRED L. LEAVITT, *Primary Examiner.*

JOHN W. HUCKERT, *Examiner.*

J. D. CRAIG. W. L. JARVIS, *Assistant Examiners.*